Oct. 19, 1965 L. P. BURKE 3,212,327
STRESS AND STRAIN MEASURING WITH TUNNEL DIODES
Filed Oct. 9, 1962 3 Sheets-Sheet 1
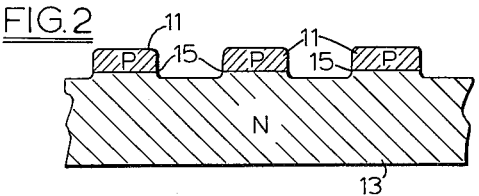
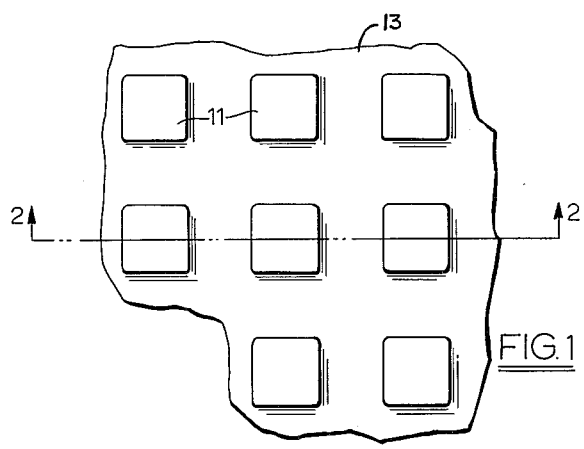
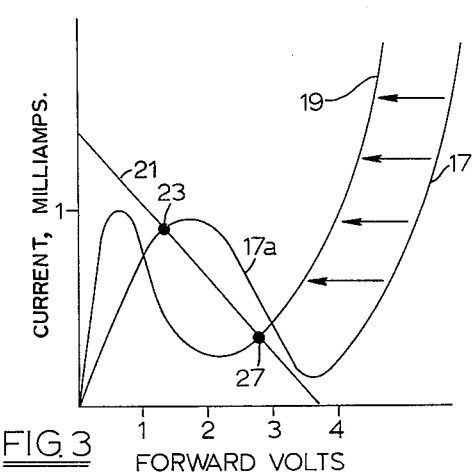
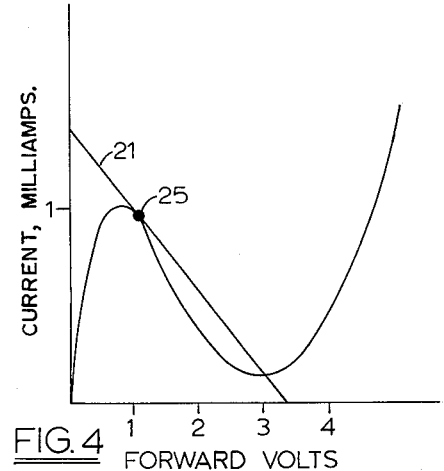
LAWRENCE P. BURKE
*INVENTOR.*
BY
attorneys Oct. 19, 1965  L. P. BURKE  3,212,327
STRESS AND STRAIN MEASURING WITH TUNNEL DIODES
Filed Oct. 9, 1962  3 Sheets-Sheet 2

LAWRENCE P. BURKE
INVENTOR.

BY S. A. Giarratana
George B. Oujevolk
attorneys.

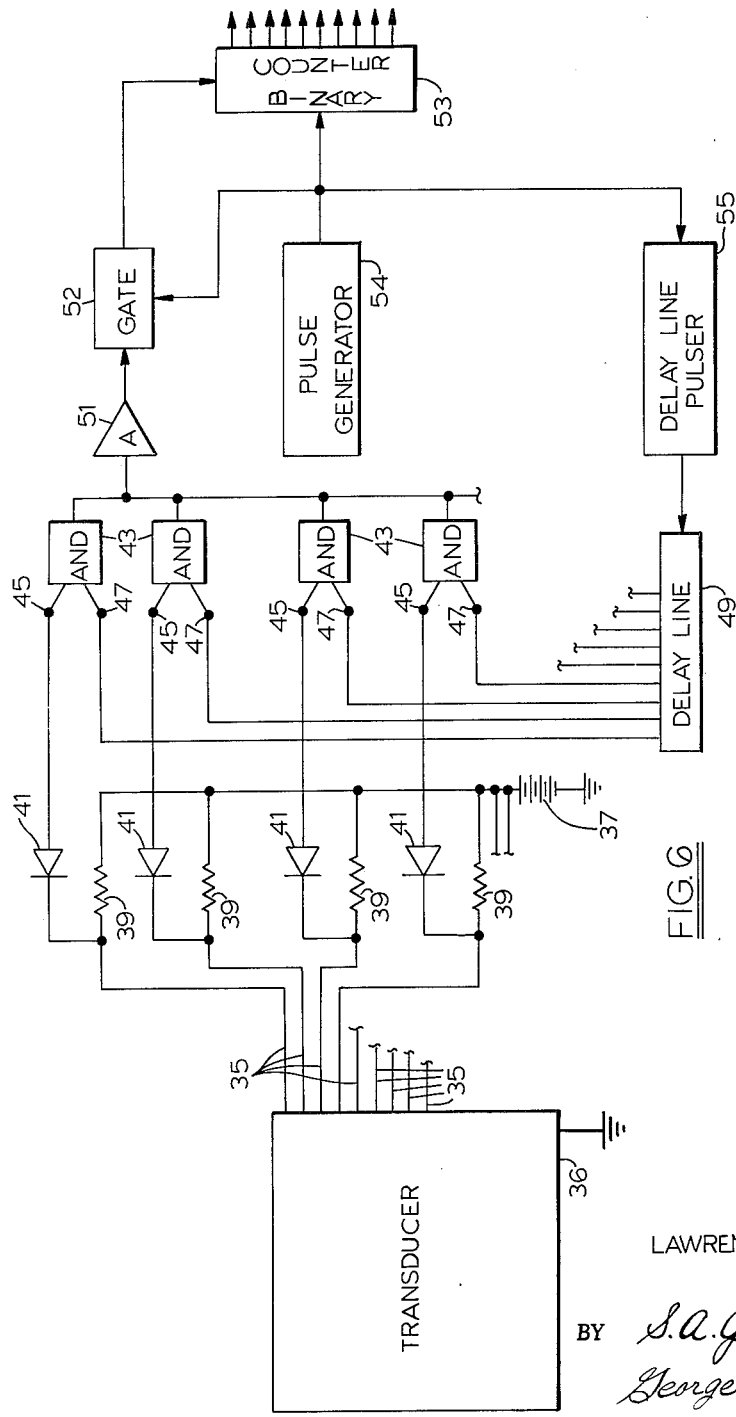

United States Patent Office 3,212,327
Patented Oct. 19, 1965

3,212,327
STRESS AND STRAIN MEASURING WITH TUNNEL DIODES
Lawrence P. Burke, Citrus Heights, Calif., assignor to General Precision Inc., Little Falls, N.J., a Delaware corporation
Filed Oct. 9, 1962, Ser. No. 229,390
4 Claims. (Cl. 73—141)

The present invention relates to stress-strain measurement, and more particularly to a system which produces a digital output directly in response to an analog pressure input and the tranducer used in this system.

Prior to the present invention, systems were known in which an analog voltage is generated in response to an applied force or pressure, and the analog voltage is converted to a digital signal by an analog to digital converter. These systems of the prior art required complex and costly electronic circuitry. The transducer of the present invention produces its output in incremental form, and the amount of electronic circuitry needed is greatly reduced.

According to the present invention, a semiconductor crystal is provided with an array of mesas, on each of which a tunnel diode is formed. Tunnel diodes have a negative resistance characteristic which varies in accordance with the pressure applied across the diode. The present invention makes use of this phenomenon to detect when the pressure applied across a tunnel diode is above, below or passes through a critical value. In the transducer of the present invention, this critical value is made different for each tunnel diode of the mesa array. The differences between the critical values are incremental so that as the pressure is increased or decreased across the tunnel diodes in the mesa array, the critical values will be passed through successively with incremental changes in the applied pressure. When an unknown force is applied across the mesa array of tunnel diodes, the resulting detection by the diodes is incremental in form and can be readily converted into any desired digital code. In the present invention, the detection by the diodes is converted into a binary code.

Accordingly, an object of the present invention is to provide an improved stress-strain transducer.

Another object of the present invention is to provide an improved system which produces a digital output representing an applied stress or strain.

A further object of the present invention is to reduce the complexity of the electronic circuitry required in systems for converting a stress or strain input into a digital output.

A still further object of this invention is to provide a unique method of detecting whether an applied pressure is above or below a predetermined value and when it passes through this value.

A still further object of this invention is to provide an improved method of measuring stress and strain.

Further objects and advantages of the present invention will become readily apparent as the following detailed decription of the invention unfolds, and when taken in conjunction with the accompanying drawings, wherein:

FIG. 1 is an enlarged fragmentary plan view of a portion of the semiconductor used in the system of the present invention;

FIG. 2 is a sectional view through the fragmentary portion of the semiconductor shown in FIG. 1 taken along the line 2—2;

FIG. 3 illustrates characteristics of a tunnel diode;

FIG. 4 shows a characteristic of a tunnel with a critical pressure applied across the junction of the diode;

FIG. 6 shows the transducer of the present invention connected in a circuit for producing binary output signals to represent the force applied across the transducer in accordance with one embodiment of the invention.

Figure 7:
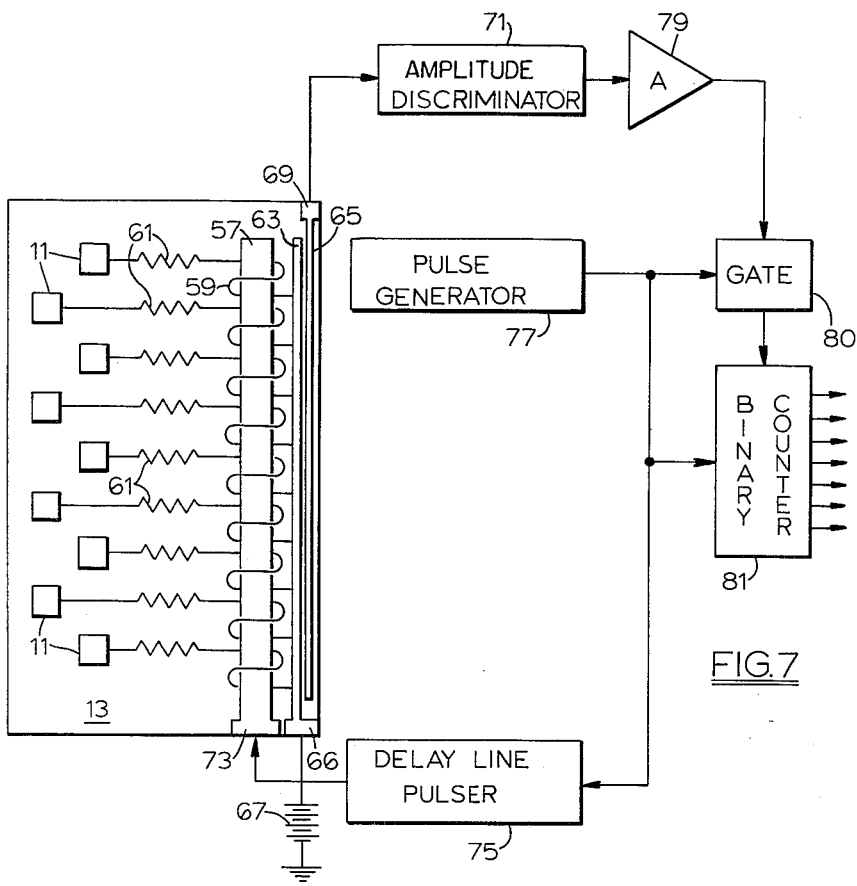
FIG. 7 illustrates another embodiment of the invention in which part of the circuitry for producing the binary output signals is deposited microcircuitry.

As shown in FIGS. 1 and 2, the semiconductor part of the transducer of the present invention comprises a plurality of mesas 11 formed integrally with a base 13. In the preferred embodiment of the invention 1024 of the mesas 11 are formed on the base 13. Only a few of these are shown in the fragmentary views of FIGS. 1 and 2. The semiconductor material of the mesas 11 and the base 13 is germanium. A PN junction 15 is formed in each mesa 11, the semiconductor material above the junction 15 being P-type material and the semiconductor material below the junction 15, including the base 13, being N-type material. The PN junctions 15 comprise tunnel diodes so that each of the mesas 11 includes a separate tunnel diode. The mesas 11, with the tunnel diodes therein, are formed on the base 13 by solution growing a P-type layer on a wafer of N-type material comprising the base 13. The pattern of mesas is then formed by masking and etching, resulting in each mesa containing a PN junction 15.

A tunnel diode has a negative resistance characteristic as illustrated by FIG. 3, which shows the voltage-current characteristic 17 of a typical tunnel diode. In the region of the characteristic 17 designated 17a, the resistance of the diode is negative, since in this region as the voltage increases the current through the diode decreases. If a pressure is applied across the junction of a tunnel diode, this voltage-current characteristic will change. The change amounts to a contraction of the voltage current characteristic along the voltage coordinates with increasing pressure. For example, a tunnel diode having the characteristic 17 with no pressure applied across its PN junction will have the characteristic designated 19 in FIG. 3, when a particular pressure is applied across its junction. The arrows in FIG. 3 indicate how the characteristic of the tunnel diode shifts with increasing pressure. If the tunnel diode is connected in series with a resistance of 2.3 kilohms across a 3.5 volt D.C. source so as to provide the load line 21, then when no pressure is applied across the PN junction of the tunnel diode the current through the tunnel diode will be approximately 0.9 milliampere and the voltage across the tunnel diode will be about 1.3 volts as indicated by the point 23 where the load line 21 intersects the characteristic 17. If the pressure across the tunnel diode is increased from zero, the current through and the voltage across the tunnel diode will not change significantly until the pressure across the tunnel diode passes through a critical value, at which the load line 21 just touches the hump of the voltage-current characteristic at the point 25, as illustrated in FIG. 4. When the pressure is increased beyond this critical value, the current and voltage will change abruptly. The current through the tunnel diode will drop about 80 percent and the voltage across the tunnel diode will more than double. Further increases in pressure across the tunnel diode above the critical pressure value will not cause significant changes in the current through and the voltage across the tunnel diode. Thus when the pressure of the tunnel diode is such as to produce the characteristic 19, which pressure is above the critical value, the voltage across the tunnel diode will be about 3 volts and the current through the tunnel diode will be about 0.2 milliampere, as indicated by the point 27 where the load line intersects the characteristic 19. Thus it will be seen that a tunnel diode can be used to detect when pressure increases past a critical value by applying the pressure across a tunnel diode, connecting the tunnel diode in series with an appropriate resistance across an appropriate voltage, and detecting when the voltage across or current through the tunnel diode changes abruptly, or in other words detecting in some manner abrupt changes in the conductivity of the tunnel diode.

When the pressure across the tunnel diode is reduced from that producing the characteristic 19, the voltage across and the current through the tunnel diode will not change significantly until the pressure reaches a critical value. Further decreases in pressure beyond this critical value will cause an abrupt drop in the voltage across the tunnel diode and an abrupt increase in the current through the tunnel diode just as it did when the pressure was increased through a critical value. Thus the tunnel diode can be used to detect when a pressure decreases through a critical value.

Figure 5:
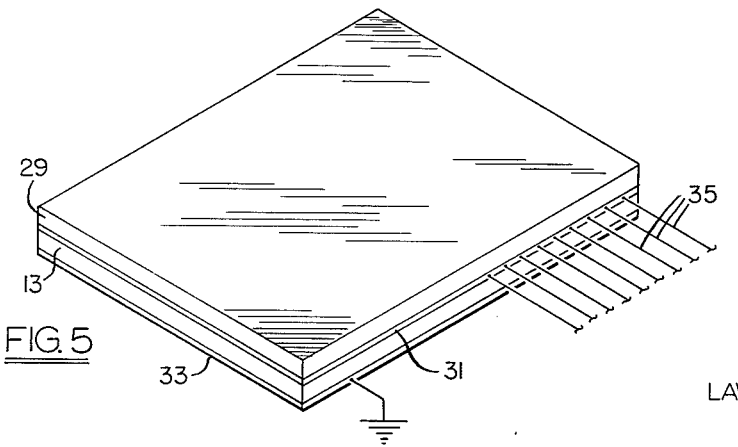
FIG. 5 illustrates the transducer of the present invention.

To use the transducer of the present invention as a force measuring instrument, a force-distributing nonconducting plate 29 is fixed to the semiconductor comprising the base 13 and the mesas 11 over the tops of the mesas 11, as shown in FIG. 5. In FIG. 5 the layer of mesas 11 is designated by the reference number 31. A layer 33 of copper is electro-deposited on the bottom of the base 13 and this copper layer 33 is grounded. A plurality of conductors 35 are severally connected to the anodes of the tunnel diodes by being connected to the P-type semiconductor material in the mesas 11 above the PN junctions 15.

FIG. 6 illustrates one embodiment of the invention for producing binary output signals representing the force applied to the transducer shown in FIG. 5. As shown in FIG. 6, the transducer is designated by the reference number 36. The positive side of a D.C. voltage source comprising a battery 37 is connected severally through resistors 39 to the conductors 35. The negative side of the battery 37 is grounded. Thus each of the tunnel diodes will be connected in series with a resistor across a source of D.C. voltage. The battery 37 and the resistors 39 provide load lines like the load line 21, one for each of the tunnel diodes so that each of the tunnel diodes will pass through critical values as the pressure across it is increased or decreased and change its conductivity abruptly as it passes through these critical values. The load line is selected for each tunnel diode so that the critical value for increasing pressure is very close to the critical value for decreasing pressure so that for practical purposes it may be considered the same for each. Accordingly in the description following each tunnel diode will be described as having one critical value which is the same for increasing or decreasing pressure.

The mesas 11 containing the tunnel diodes are differentially doped by etching with potassium hydroxide so that the characteristic of each tunnel diode is different from the others. The characteristics of the tunnel diodes and the values of the resistors 39 are selected so that the critical values of the tunnel diodes will differ incrementally. That is, as the pressure across the diodes increases or decreases, the tunnel diodes will pass successively through their critical values with one tunnel diode passing through its critical value with each incremental change of applied pressure. Therefore by detecting what state of conductivity each of the tunnel diodes is in, the force applied to the transducer 36 can be determined. The remaining circuitry shown in FIG. 6 performs this function and produces a binary output representing the force applied across the tunnel diodes. The conductors 35 are severally connected to the anodes of diodes 41, the cathodes of which are severally connected to inputs of different AND gates 43. Each of the AND gates 43 has two inputs 45 and 47. The cathodes of the diodes 41 are severally connected to the inputs 45 of the AND gates 43. The inputs 47 of the AND gates 43 are severally connected to different outputs of a delay line 49 spaced evenly along the length thereof. When one of the conductors 35 is at a relatively high voltage indicative that the pressure applied to the tunnel diode connected to this conductor 35 is above its critical value, then the input 45 of the AND gate 43, which is connected to this conductor 35 through one of the diodes 41 will be at a relatively high voltage. When one of the AND gates 43 has its input 45 at a relatively high voltage because it is connected through one of the diodes 41 to a tunnel diode having an applied pressure above its critical value and a pulse is applied to the input 47 of this AND gate, then this AND gate will pass the pulse to its output. On the other hand, if the input 45 of an AND gate 43 is at a relatively low voltage because it is connected to a tunnel diode the pressure across which is below its critical value, then a pulse applied to the input 47 of such an AND gate 43 will not be passed through to its output. Thus when pulses are applied to the inputs 47 of the AND gates 43, the state of conductivity of each of the tunnel diodes is sensed and in this manner it is determined for each of the tunnel diodes whether or not the pressure applied across such tunnel diode is above or below its critical value.

As pointed out above, the inputs 47 of the AND gates 43 are connected severally to different outputs tapped along the length of a delay line 49. When a pulse is applied to the input of the delay line 49 this pulse will be applied sequentially to the inputs 47 of all the AND gates 43. The AND gates 43 which are connected to tunnel diodes having pressures applied thereto above their critical values will pass pulses along to their outputs and the AND gates 43 which are connected to tunnel diodes having pressures applied thereto below their critical values will not pass the applied pulses along to their outputs. Because the pulses are applied to the inputs 47 of the AND gates 43 sequentially, the pulses produced at the outputs of the AND gates 43 will be produced sequentially. These pulses are all amplified by an amplifier 51 and applied to a gate 52. The gate 52 will be enabled when the sequential pulses are applied and will pass the pulses on to a binary counter 53, which counts the applied pulses and registers the count. The counter 53 is a conventional binary counter and produces binary output signals representing the count that it registers.

A pulse generator 54 applies periodic pulses to a delay line pulser 55. The pulser 55 in response to each pulse applied from the pulse generator 54 applies a pulse to the input of the delay line 49, which in response thereto applies pulses sequentially to the inputs 47 of the AND gates 43. Thus in response to each output pulse of the pulse generator 54, the AND gates 43 which are connected to diodes having pressures applied thereto above their critical values will pass the applied sequential pulses to the amplifier 51. The number of sequential pulses passed to the amplifier 51 in this manner in response to each pulse produced by the pulse generator 54 will equal the number of tunnel diodes which have pressures applied thereto above their critical values and therefore will be proportional to the force applied to the transducer. Each time the pulse generator applies a pulse to the delay line pulser 55, it also applies a pulse to the counter 53 to set it to zero. The counter 53, being set to zero in response to each output pulse of the pulse generator 54, will count and register the number of sequential output pulses produced by the AND gates 43 in response to each output pulse of the pulse generator 54. Thus the counter 53 will register a count proportional to the force applied to the transducer, which count is recomputed each time the pulse generator 54 produces a pulse. The binary counter 53 produces binary output signals representing the registered count and therefore representing the force applied to the transducer. Each time the pulse generator 54 applies a pulse to the pulser 55, it also applies a pulse to the gate 52, which in response thereto is enabled for a predetermined time interval long enough for all of the sequential pulses to pass through. In this manner the gate 52 is enabled only during the intervals when a pulse is traveling down the delay line 49. This feature permits the counter 53 to be used for storage in case of failure of the pulse generator 54. Thus a transducer is provided which represents with a binary output the magnitude of an applied force with a minimum of electronic circuitry.

FIG. 7 illustrates an alternative system for converting the incremental outputs from the tunnel diodes into binary signals. In the system of FIG. 7, microcircuitry is deposited on the base 13. To illustrate this microcircuitry FIG. 7 shows a transducer with a force-distributing layer 29 removed. As shown in FIG. 7, a thin film-type delay line 57 is deposited on the base 13. A plurality of coils equal to the number of mesas 11 are deposited on the base 13 wound around the thin film delay line 57. These coils are designated by the reference number 59. The coils 59 are severally connected by deposited conductors through deposited resistors 61 to the anodes of the tunnel diodes, which are the P-type regions of the mesas 11. The other sides of the coils 59 are connected in common to a deposited conducting strip 63 which forms one plate of a capacitor. The other plate of the capacitor is formed by a conducting strip 65 deposited alongside of and closely adjacent to the strip 63. The conducting strip 63 is also connected by a deposited conductor to a terminal 66 to which the positive side of a battery 67 is connected. The negative side of the battery 67 is grounded. The battery 67 and the resistors 61 have the same values as the battery 37 and the resistors 39 in the system of FIG. 6. The strip 65 is connected by a deposited conductor to a terminal 69, which is connected to the input of an amplitude discriminator 71. One end of the thin film delay line 57 is connected to a terminal 73 which is connected to the output of a delay line pulser 75. A pulse generator 77 applied periodic pulses to the delay line pulser 75, which in response to each applied pulse applies a pulse to the thin film delay line 57. Each pulse applied to the delay line 57 travels up the delay line and passes through the deposited coils 59. Each of the coils 59 will either have a relatively high current flowing therethrough because the tunnel diode to which the coil is connected has a pressure applied thereto below its critical value, or will have a relatively low current flowing therethrough because the tunnel diode to which it is connected has a pressure applied thereto above its critical value. Each pulse traveling down the thin film delay line 57 applied by the delay line pulser 75 will interact with the magnetic fields produced by the coils 59 and induce pulses in the coils 59. The coils 59 which have relatively high currents flowing therethrough as a result of being connected to tunnel diodes which have pressures applied thereto below their critical values will generate relatively large magnetic fields. A pulse traveling down the delay line 57 passing through these coils will transfer a relatively large amount of its energy to these coils, and as a result relatively large pulses will be generated in these coils 59. On the other hand, the coils 59 which have relatively low currents flowing therein, as a result of being connected to tunnel diodes which have pressures applied thereto above their critical values, will generate relatively small magnetic fields, and a pulse traveling down the delay line 57 will transfer relatively small amounts of its energy to these coils 59. As a result, relatively small pulses will be induced in the coils 59 which are connected to tunnel diodes having pressures applied thereto above their critical values. Because the pulses are produced in the coils 59 by a pulse traveling down the thin film delay line 57 the pulses will be produced in the coils 59 sequentially. These sequential pulses will pass through the capacitor comprising the strips 63 and 65 and be applied to the input of the amplitude discriminator 71. The amplitude discriminator 71 only passes pulses which are above a predetermined amplitude to an amplifier 79 which amplifies the pulses passed by the amplitude discriminator 71 and applies them to the input of gate 80. The gate 80 will be enabled when the sequential pulses are applied and will pass them on to the input of a binary counter 81. Prior to receiving the pulses the counter 81 will have been reset to zero. The binary counter 81 counts the sequential pulses, registers the count, and produces binary output signals representing the count registered. The amplitude discriminator 71 is adjusted so that it will not pass the relatively low amplitude pulses induced in the coils 59 which are connected to tunnel diodes having pressures applied thereto above their critical values, but will pass the relatively high amplitude pulses induced in the coils 59 which are connected to tunnel diodes having pressures applied thereto below their critical values. Thus the number of pulses passed in sequence to the amplifier 79 will be equal to the number of tunnel diodes which have pressures applied thereto below their critical values. When these pulses have been counted by the counter 81, it will produce binary output signals representing the count. These binary output signals therefore will represent the number of tunnel diodes in the mesa array of the transducer which have pressures applied thereacross below their critical values. This number will vary inversely with the force applied to the transducer and therefore the binary output signals of the counter 81 can be used to represent the applied force.

Each time the pulse generator 77 applies a pulse to the delay line pulser 75, it also applies a pulse to the binary counter 81 to reset it to zero. In this manner the binary counter is reset to zero prior to the application of each train of sequential pulses produced in the coils 59 in response to a pulse traveling down the delay line 57. Each time the pulse generator 77 applies a pulse to the delay line pulser 75, it also applies a pulse to the gate 80, which in response thereto is enabled for predetermined time interval sufficiently long for all of the sequential pulses produced by the coils 59 in response to the output pulse of the pulse generator 77 to pass through. In this manner the gate 80 is enabled only during the intervals when the sequential pulses produced by the coils 59 are being applied. Because of the action of the gate 80, the binary counter 81 can be used as a storage register in case of failure of the pulse generator 77. Thus a binary representation of the applied force is obtained with a minimum amount of electronic circuitry.

Many modifications may be made to the embodiments of the invention herein disclosed without departing from the spirit and scope thereof which is defined in the appended claims.

What is claimed is:

1. A digital stress and strain measuring apparatus, comprising in combination, at least one series of tunnel diodes of the doped layer mesa type formed on a common base, each means forming a p-n junction with said base, a force distributing plate over said mesas;

a resistor load line connected to each mesa, the load value for each tunnel diode being pre-selected with respect to the doping for each mesa so that the critical value of each tunnel diode differs incrementally from at least two other tunnel diodes in said series in response to a force applied thereto;

a delay line, means, evenly spaced over the length thereof, coupling each of said tunnel diodes to said delay line, a pulse source to apply pulses to said delay line so as to sequentially apply inputs to each of said tunnel diodes;

output means coupled to each of said tunnel diodes providing an output each time any of the tunnel diodes has a pulse applied thereto and the critical value for that particular tunnel diode is exceeded; and, computer means coupled to said output means to provide a digital value corresponding to the total output from all the tunnel diodes.

2. A digital stress and strain measuring apparatus, comprising in combination,
   a base of cathode N-type material having a plurality of doped P-type layer mesas thereon forming at least one series of tunnel diode anodes, a force distributing plate over said means;
   a resistor load line connected to each anode, the load value for each tunnel diode being pre-selected with respect to the doping for each anode so that the critical value of each tunnel diode differs incrementally from at least two other tunnel diodes in said series in response to a force applied thereto;
   a delay line, means, evenly spaced over the length thereof, coupling each of said tunnel diodes to said delay line, a pulse source to apply pulses to said delay line so as to sequentially apply inputs to each of said tunnel diodes;
   output means coupled to each of said tunnel diodes providing an output each time any of the tunnel diodes has a pulse applied thereto and the critical value for that particular tunnel diode is exceeded; and,
   computer means coupled to said output means to provide a digital value corresponding to the total output from all the tunnel diodes.

3. A digital stress and strain measuring apparatus, comprising in combination,
   a base of cathode N-type material having a plurality of doped P-type layer mesas thereon forming at least one series of tunnel diode anodes, a force distributing plate over said mesas;
   a resistor load line connected to each anode including a lead line of coupling a D.-C. power source, the resistor load line value for each tunnel diode being pre-selected with respect to the doping for each anode so that the critical values of each tunnel diode differs incrementally from at least two other tunnel diodes in said series in response to a force applied thereto;
   AND gates for each tunnel diode, each AND gate having two inputs, one input being connected to the cathode of the tunnel diodes, a delay line, the other input to each AND gate being connected to said delay line evenly spaced along the length thereof;
   a pulse source to apply pulses to said delay line so as to sequentially apply inputs to each of said AND gates, and AND gates however only supplying an output if the corresponding tunnel diode has a pressure applied thereto by said plate above the critical value for that particular tunnel diode; and,
   computer means coupled to the output of said AND gates to provide a digital value corresponding to the total output from all the tunnel diodes.

4. A digital stress and strain measuring apparatus, comprising in combination,
   a base of cathode N-type material having a plurality of doped P-type layer mesas thereon forming at least one series of tunnel diode anodes, a force distributing plate over said mesas;
   a resistor load line connected to each anode, the load value for each tunnel diode being pre-selected with respect to the doping for each anode so that the critical values of each tunnel diode differs incrementally from at least two other tunnel diodes in said series;
   a delay line, a plurality of coils equal to the number of mesas wound around said delay line evenly spaced along the length thereof, each coil being connected at one end to a separate one of said resistor load lines;
   a first elongated conducting strip in the vicinity of said delay line forming one plate of a capacitor, the other end of said coils each being connected thereto, a second elongated conducting strip in close proximity to said first strip forming a second plate of a capacitor;
   amplitude discriminator means coupled to the output of said second strip passing only signals above a predetermined amplitude; and,
   a pulse source connected to said delay line to apply pulses thereto and computer means coupled to said amplitude discriminator means to provide a digital value corresponding to the total sequential output from said amplitude discriminator means.

References Cited by the Examiner

UNITED STATES PATENTS 3,021,517   2/62   Kaenel _____ 307—88.5
3,065,636   11/62  Pfann _____ 73—88.5

OTHER REFERENCES

Amodei et al.: "Analog to Digital Converter," RCA Technical Notes, No. 492, September 1961, sheets 1 and 2.

Esaki et al.: "A New Device Using the Tunneling Process in Narrof P-N Junctions," Solid State Physics, vol. 1, March 1960, pages 1, 14 and 15.

Rogers: "Experimental Tunnel-Diode Electromechanical Transducer Elements and Their Use in Tunnel-Diode Microphones," The Journal of the Acoustical Society of America, vol. 34, No. 7, July 1962, pages 883 to 893.

RICHARD C. QUEISSER, *Primary Examiner.*